(12) United States Patent
Huang et al.

(10) Patent No.: US 11,681,042 B2
(45) Date of Patent: Jun. 20, 2023

(54) SPARSE EXCITATION METHOD FOR 3-DIMENSIONAL UNDERGROUND CABLE LOCALIZATION BY FIBER OPTIC SENSING

(71) Applicant: NEC Laboratories America, Inc., Princeton, NJ (US)

(72) Inventors: Ming-Fang Huang, Princeton, NJ (US); Ting Wang, West Windsor, NJ (US); Hansi Liu, North Brunswick, NJ (US)

(73) Assignee: NEC Corporation, Tokyo (JP)

( * ) Notice: Subject to any disclaimer, the term of this patent is extended or adjusted under 35 U.S.C. 154(b) by 54 days.

(21) Appl. No.: 17/195,538

(22) Filed: Mar. 8, 2021

(65) Prior Publication Data

US 2021/0311186 A1 Oct. 7, 2021

Related U.S. Application Data

(60) Provisional application No. 63/006,132, filed on Apr. 7, 2020.

(51) Int. Cl.
| | | |
|---|---|---|
| *G01S 15/42* | (2006.01) | |
| *G01D 5/353* | (2006.01) | |
| *G01V 1/30* | (2006.01) | |
| *G01V 1/18* | (2006.01) | |

(52) U.S. Cl.
CPC ............ *G01S 15/42* (2013.01); *G01D 5/353* (2013.01); *G01V 1/181* (2013.01); *G01V 1/306* (2013.01)

(58) Field of Classification Search
None
See application file for complete search history.

(56) References Cited

U.S. PATENT DOCUMENTS

| | | | | |
|---|---|---|---|---|
| 7,992,440 B2* | 8/2011 | Kumagai | ............... | G01H 9/004 |
| | | | | 356/465 |
| 9,435,902 B2* | 9/2016 | Hill | ................. | G01V 1/186 |
| 9,453,821 B2* | 9/2016 | Minto | ............... | G01M 5/0091 |
| 9,500,767 B2* | 11/2016 | Barfoot | ................ | G01V 8/16 |
| 9,599,504 B2* | 3/2017 | Rollinger | ............... | G01V 1/001 |
| 10,281,606 B2* | 5/2019 | Erdemir | ................ | G01V 1/48 |
| 10,444,063 B2* | 10/2019 | Jung | ..................... | G01H 9/004 |
| 11,060,950 B1* | 7/2021 | Xia | ................... | G01M 11/3145 |
| 11,187,617 B2* | 11/2021 | Champavere | ...... | G01M 11/3154 |
| 2006/0096380 A1* | 5/2006 | Novascone | ............. | G01V 1/46 |
| | | | | 73/649 |
| 2009/0132183 A1* | 5/2009 | Hartog | .................. | G01K 11/32 |
| | | | | 702/42 |
| 2011/0320147 A1* | 12/2011 | Brady | ................ | G01D 5/35361 |
| | | | | 385/12 |
| 2012/0176250 A1* | 7/2012 | Duncan | ................ | G01V 11/002 |
| | | | | 340/853.2 |
| 2012/0179378 A1* | 7/2012 | Duncan | ................ | E21B 47/008 |
| | | | | 702/8 |

(Continued)

FOREIGN PATENT DOCUMENTS

| | | | |
|---|---|---|---|
| JP | 2008267089 A | * | 11/2008 |
| KR | 101899079 B1 | * | 9/2018 |

*Primary Examiner* — Isam A Alsomiri
*Assistant Examiner* — Vikas Atmakuri
(74) *Attorney, Agent, or Firm* — Joseph Kolodka

(57) ABSTRACT

Aspects of the present disclosure describe distributed fiber optic sensing systems, methods, and structures that advantageously are employed to determine the location and depth of underground fiber-optic facilities that may be carrying telecommunications traffic.

5 Claims, 3 Drawing Sheets

(56) References Cited

U.S. PATENT DOCUMENTS

| | | | |
|---|---|---|---|
| 2012/0224169 A1* | 9/2012 | Kumagai | G08B 13/186 356/73.1 |
| 2014/0362668 A1* | 12/2014 | McEwen-King | B61L 23/06 367/118 |
| 2016/0154142 A1* | 6/2016 | Stokely | G01V 11/002 73/152.58 |
| 2021/0140814 A1* | 5/2021 | Aktas | G01D 5/35361 |

* cited by examiner

SPARSE EXCITATION METHOD FOR 3-DIMENSIONAL UNDERGROUND CABLE LOCALIZATION BY FIBER OPTIC SENSING

CROSS REFERENCE

This disclosure claims the benefit of U.S. Provisional Patent Application Ser. No. 63/006,132 filed 7 Apr. 2020 the entire contents of which is incorporated by reference as if set forth at length herein.

TECHNICAL FIELD

This disclosure relates generally to determining geographical location(s) and depth(s) of underground optical fiber cables. More specifically, it pertains to the localization and depth determination of such underground optical fiber cables through the use of distributed fiber optic sensing (DFOS) techniques.

BACKGROUND

In the coming years, cloud computing and Internet of Things applications—along with existing Internet and communications application—will continue to generate explosive growth in global data traffic. Such explosive growth results in a great need for fast and reliable fiber-optic telecommunications facilities.

As is known in the art, such fiber-optic facilities are oftentimes deployed underground. Accordingly, there is a continuing need for systems, methods, and structures that detect the locality and depth of fiber-optic cables.

SUMMARY

An advance in the art is made according to aspects of the present disclosure directed to distributed fiber optic sensing systems (DFOS), methods, and structures that are advantageously employed to determine underground fiber-optical cable locations and depth.

According to certain aspects of the present disclosure, we first determine a speed at which mechanical vibrations propagate in underground soil by using geophone array and vibration source. Once the speed of the vibration propagation in the soil is known, a time of flight (TOF) between vibration source(s) and underground fiber is used to determine distance therebetween via DFOS. Multiple distances from different vibration source positions allow pin-pointing a 3D location (latitude, longitude and depth) of the underground fiber. By changing the vibration source position, 3D locations of other fiber receiver points of interest can also be determined and thus a segment of underground fiber can be located in three dimensions.

Viewed from a particular aspect, the present disclosure describes a method of fiber-optic localization comprising: providing a distributed fiber optic sensing (DFOS) system having an optical fiber cable having a fiber segment of interest that is underground; a DFOS interrogator system in optical communication with the optical fiber cable; and an intelligent analyzer configured to analyze DOFS sensing data received by the DOFS interrogator system; providing a plurality of ground vibration sources and activating the vibration sources such that a vibration excitation is produced; operating the DFOS system to determine the underground location of the fiber segment of interest.

BRIEF DESCRIPTION OF THE DRAWING

A more complete understanding of the present disclosure may be realized by reference to the accompanying drawing in which.

DESCRIPTION

Figure 1:
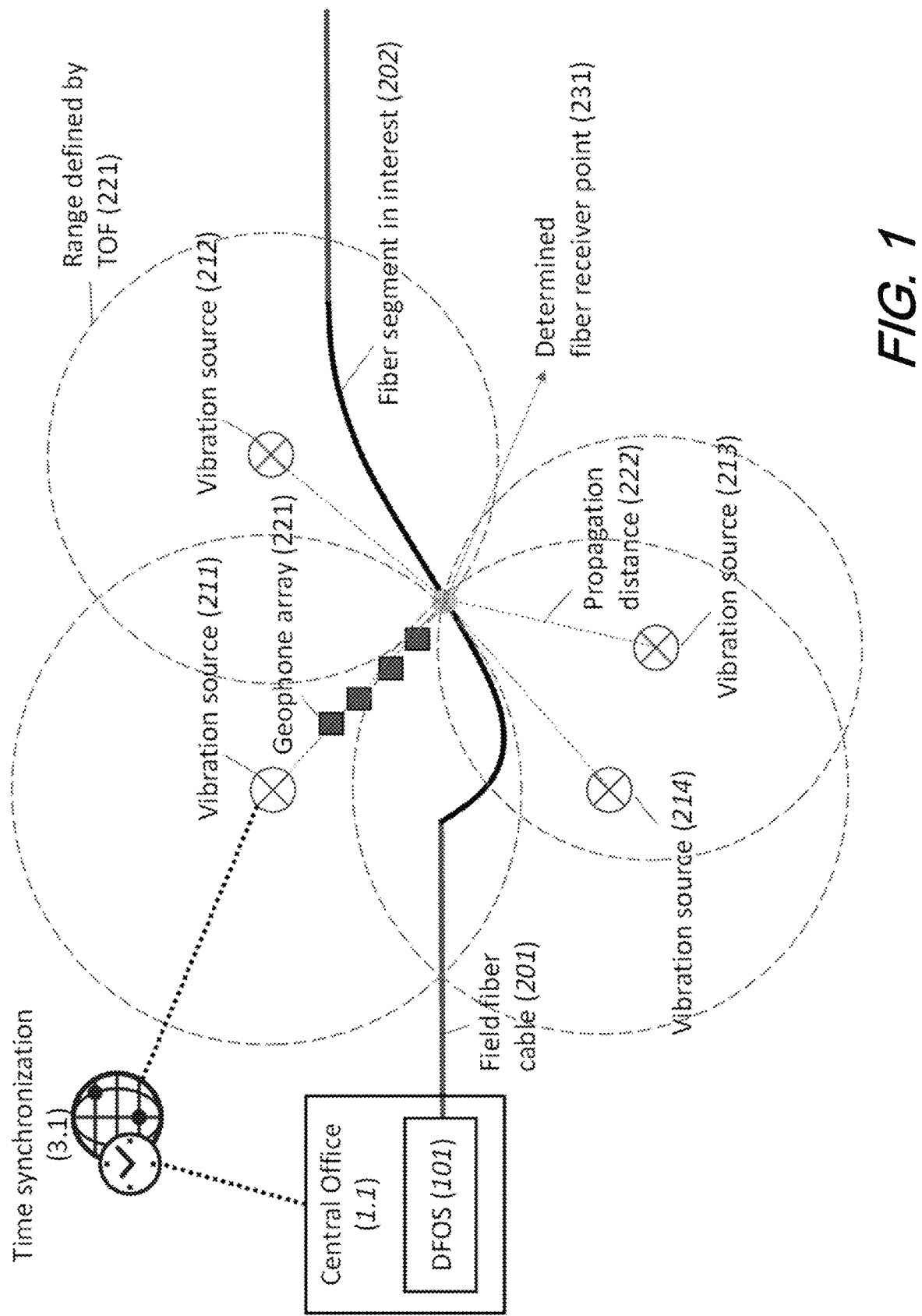
FIG. 1 is a schematic diagram showing an illustrative fiber localization via multi-lateration according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting once again that determining/knowing/mapping geographical locations and depths of underground fiber-optic cables is of great significance for telecommunications carriers and network providers in order to efficiently maintain such underground facilities—since much maintenance work involves underground operation that oftentimes requires excavating a large area of ground. Usually, underground maintenance operations rely on prior information and knowledge of cable location, which can be acquired from construction maps or notes and photos that are made during construction/installation. Oftentimes however, such information is not up-to-date or incomplete due to missing papers or photos. When prior knowledge is absent, it becomes challenging for operators to locate and pin-point an exact segment of a fiber cable that requires inspection and/or repair.

Those skilled in the art will know and appreciate that while one can roughly infer an underground cable location and orientation from a visual inspection of surrounding poles or other facilities—for example, where a cable enters/exits the underground—the depth of the underground cable may still be unknown. Knowing the depth of the cable is vital as it helps operators to decide how deep they should investigate and whether there are other structures or facilities in the middle of a depth range (so that extra planning is needed to avoid damage when digging). Additionally, there are numerous occasions in which a single fiber-optic cable spans great distances—and it is time and labor consuming to dig up the ground and search for a fiber-optic cable of interest among complicated underground environment. Thus, there is a growing demand for high-precision localization of the underground fiber cables using non-destructive method.

At this point we note that oftentimes fiber-optic cables are co-located with mated "tracer wires"—namely electrically conductive wires that allow for trace detection from the surface. Unfortunately, such detection requires manually traversing along the length of the fiber-optic and while the path of the fiber-optic may be determined—the depth remains largely unknown from such techniques.

Depth estimation underground objects can be performed using vibration or electromagnetic wave. For vibration-based or seismic methods, one may excite a vibration on the surface of the ground and measure the reflected wave from the object using vibration sensors. However, this method is limited to detecting large or bulky objects which exhibit quite different properties than the surrounding soil when buried deep underground. For smaller objects located more near-surface—such as fiber optic cables, it is difficult to successfully distinguish and separate a signal reflected from an object of interest from background noise due in part to a high-complexity and in-homogeneity of soil.

Depth-determining techniques employing electromagnetic (EM) wave(s) are likewise employed for underground linear structures such as pipes, sewers, and conduits. By using off-the-shelf ground penetrating radar (GPR), one generally makes a grid scan of a region of interest and interprets data generated from reflected EM wave to discover/locate linear structures and determine object depth. Notwithstanding such utility however, GPR cannot identify categories of detected objects if EM waves reflect from multiple objects. Thus, GPR techniques require comprehensive planning of the scan pattern and careful inspection of data to determine potential locations of objects of interest. Moreover, high-resolution GPR is quite expensive and requires special training to operate and interpret data correctly.

Given such limitations of the prior art, we now disclose and describe the localization and depth determination of underground fiber-optic cable using distributed fiber optic sensing (DFOS) techniques.

At this point we note that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

As we shall show and describe—systems, methods, and structures according to aspects of the present disclosure employs a DVS (Distributed Vibration Sensor) or DAS (Distributed Acoustic Sensor) interrogator to recover a vibration occurring anywhere along a sensing fiber.

According to aspects of the present disclosure, we first obtain the speed of a vibration propagation in a certain type of soil by using a geophone array and vibration source. Once the speed of the vibration propagation in the soil is known, the DFOS system uses the time of flight between the vibration source and underground fiber to determine the distance between them. Multiple distances from different vibration source positions allow one to pin-point a 3D location (latitude, longitude and depth) of an underground fiber. By changing the position of the vibration source, 3D locations of other fiber receiver points can also be determined and thus a segment of underground fiber can be reconstructed.

FIG. 1 is a schematic diagram showing an illustrative architecture an and system for fiber localization via multilateration according to aspects of the present disclosure. As shown in that figure, a distributed fiber optic sensing (DFOS) system (101) is positioned in a central office (1.1) such that it may provide remote, long-range monitoring of an area of interest. As noted, DFOS technologies employed may include distributed vibration sensing (DVS) or distributed acoustic sensing (DAS) that operate through field-deployed fiber-optic cable (201).

In the field, where a fiber segment in interest (202) is buried in an unknown location—or only an approximate location is known—a non-linear sparse vibration excitation method according to aspects of the present disclosure is employed to determine fiber location. As will be appreciated by those skilled in the art, a vibration source (211) may include any vibratory source such as a hammer-plate, modal shaker and/or jack hammer—among others.

In operation, for each vibration excitation, a time synchronization (3.1) is determined between the vibration source (211) and DFOS (101) at the central office (1.1) so that absolute time of flight (TOF) can be obtained. Moreover, a receiver array that contains—for example—4 geophones (221) is positioned in far-field so that underground signal propagation speed (v) can be calculated from time difference of arrival on each of the geophones. In this manner, we obtain a distance (D) measurement from each vibration source (211) by multiplying TOF by v, which indicates a possible location of fiber receiver point (231) is on the surface of a sphere (221) whose radius is D (222). Those skilled in the art will understand that if we have measurements from four non-linear vibration sources (211, 212, 213, 214), we can geometrically pin-point the fiber receiver point (231). As we further add more measurements by exciting vibration at different locations, more receiver points' locations and depths will be estimated and the segment of the fiber (202) can be determined.

Note that unlike free space, in which sound travels at a constant speed and environmental impact may be ignored, the speed of an underground vibration propagation is heavily influenced by ground conditions including soil materials, density, humidity and other factors. In order to obtain an accurate propagating speed of vibration to enable the subsequent calculation of distance from the vibration source (211) to fiber (231), we perform a speed calibration by deploying geophone arrays at fixed locations and moving the vibration source from locations close to the geophone array to places that are far removed.

Figure 2:
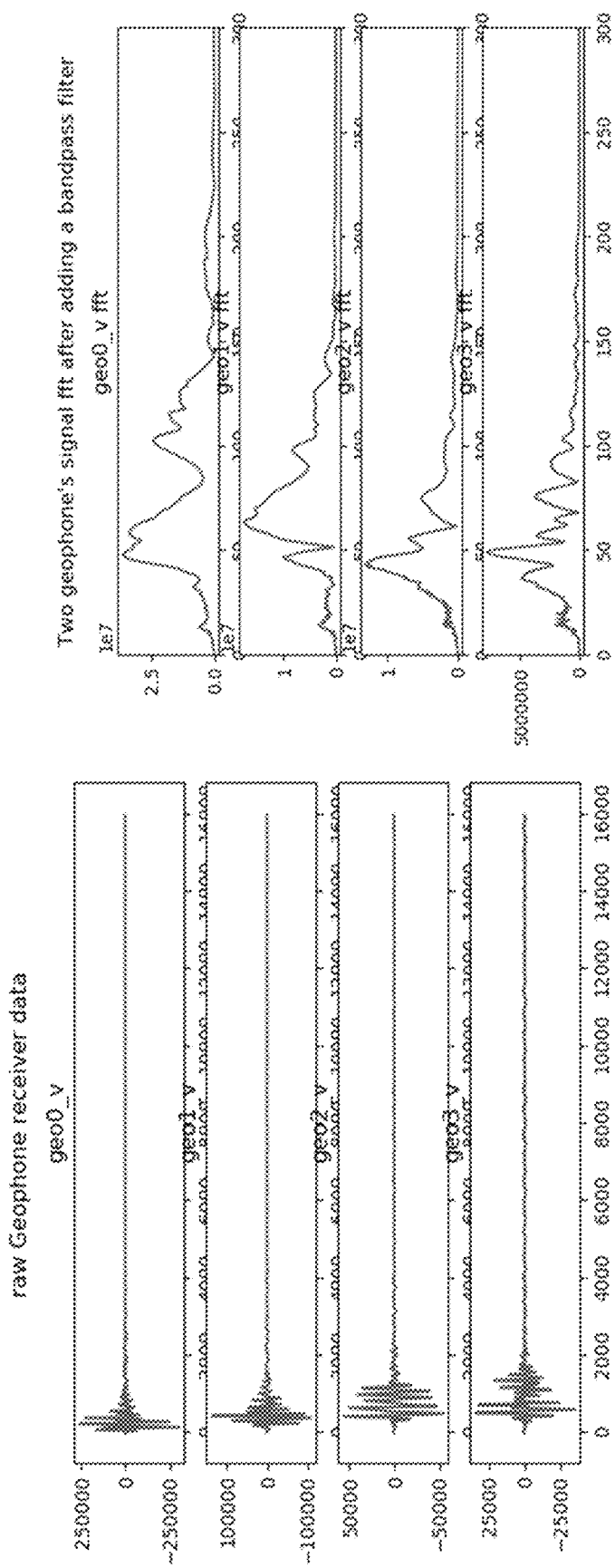
FIG. 2 is a series of plots showing illustrative received signals on geophone array(s) and corresponding spectra according to aspects of the present disclosure.

FIG. 2 is a series of plots showing received signals and frequency spectra of four geophones according to aspects of the present disclosure. Using cross correlation, we are able to determine time delays between these signals.

Figure 3:
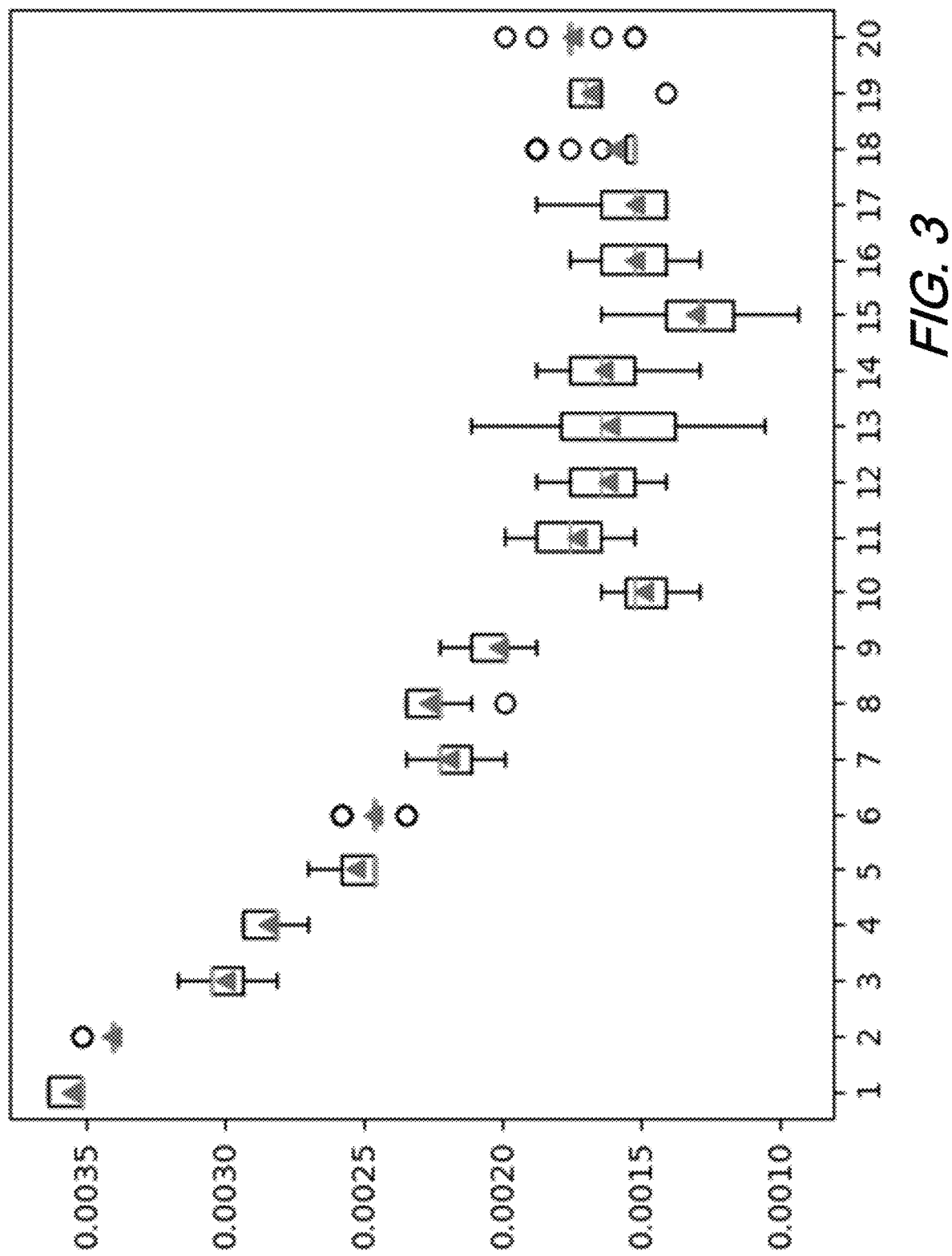
FIG. 3 is a plot showing illustrative time difference of arrival for two geophones according to aspects of the present disclosure.

FIG. 3 is a plot showing time difference of arrival between two geophones according to aspects of the present disclosure. As shown in the figure, as we move the vibration source from "near-field" (distance less than the wavelength of vibration) to "far-field" (distance greater than the wavelength of vibration), the time difference between two geophones gradually converges to 0.0015 seconds, from which we can calculate the speed of the surrounding soil by dividing the geophone spacing by the converged time difference of arrival. From this observation, we can measure the speed of the vibration by measuring the time delays on geophone array that is deployed at far-field distance.

Considering the fact that an underground environment is usually non-uniform and non-homogeneous, the speed of vibration propagation may vary for different patches of soil. Thus, it is necessary to measure the speed on each vibration source for multi-lateration method described above.

At this point, while we have presented this disclosure using some specific examples, those skilled in the art will recognize that our teachings are not so limited. Accordingly, this disclosure should only be limited by the scope of the claims attached hereto.

The invention claimed is:

1. A method of fiber-optic localization comprising:
   providing a distributed fiber optic sensing (DFOS) system having
      an optical fiber cable having a fiber segment of interest that is underground;
      a DFOS interrogator system in optical communication with the optical fiber cable; and
      an intelligent analyzer configured to analyze DOFS sensing data received by the DOFS interrogator system;
   providing a plurality of ground vibration sources and activating the vibration sources such that a vibration excitation is produced;
   operating the DFOS system to determine the underground location of the fiber segment of interest;
   determining a speed of propagation at which vibrations produced by the ground vibration sources propagate through the underground;
   determining from the speed of the vibration propagation a distance between the vibration sources and the underground location of the fiber segment of interest;
   synchronizing time between vibration sources and DFOS system by calibration,
   wherein the wherein the calibration comprises:
      providing and operating a geophone array positioned at a fixed location;
      operating the vibration sources and successively moving the vibration sources from locations that are relatively closer to the geophone array to locations that are relatively farther away from the geophone array;
   wherein the vibration sources are moved from a near-field distance less than a wavelength of vibration to a far-field distance greater than the wavelength of vibration until a time difference between two geophones of the array converge.

2. The method of claim 1 wherein the vibration propagation speed in underground is determined by dividing geophone spacing by converged time difference.

3. The method of claim 2 wherein the vibration propagation speed is determined for each individual one of the ground vibration sources.

4. The method of claim 3 wherein the geophone array includes at least 4 individual geophones.

5. The method of claim 4 wherein a distance from each vibration source to the fiber segment of interest is determined by multiplying a time of flight (TOF) by propagation speed.

\* \* \* \* \*